United States Patent

[11] 3,532,139

| [72] | Inventor | Tomaso Ruscitti, |
| | | Via Amedeo D'Aosta 11, Milan, Italy |
| [21] | Appl. No. | 745,288 |
| [22] | Filed | July 16, 1968 |
| [45] | Patented | Oct. 6, 1970 |
| [32] | Priority | July 29, 1967 |
| [33] | | Italy |
| [31] | | 189 72/67 |

[54] HEAD FOR FILLING CONTAINERS, SUCH AS AEROSOL CONTAINERS, WITH A PREDETERMINED AMOUNT OF A FLUID
4 Claims, 3 Drawing Figs.

| [52] | U.S. Cl. | 141/20, 141/3 |
| [51] | Int. Cl. | B65b 3/04 |
| [50] | Field of Search | 141/20, 3, 15; 239/338, 398(Considered) |

[56] References Cited
UNITED STATES PATENTS

| 2,989,993 | 6/1961 | Osmond | 141/20 |
| 3,176,727 | 4/1965 | Raussean | 141/20 |
| 3,179,132 | 4/1965 | Focht | 141/20 |
| 3,273,607 | 9/1966 | O'Neill | 141/3 |
| 3,354,916 | 11/1967 | Ruscitti | 141/20 |

Primary Examiner—Herbert F. Ross
Attorney—Steinberg and Blake

ABSTRACT: Head for filling a container with a predetermined amount of a fluid, the head comprising a piston movable within a cylinder, with the lower portion of which a hollow chamber is fast and communicates with the cylinder through a hole. The chamber and upper portion of the cylinder communicate with a pressurized fluid supply. A rigid body member enters the chamber and can move therein, the body member being passed through by a hole, the container to be filled being drawn near the lower end of the hole, the upper end of which communicates with the interior of the cylinder only when the rigid body member is caused to penetrate into the chamber to a maximum extent shutting off the communication between the chamber and cylinder.

Patented Oct. 6, 1970

INVENTOR
TOMASO RUSCITTI

BY Steinberg & Blake

ATTORNEYS

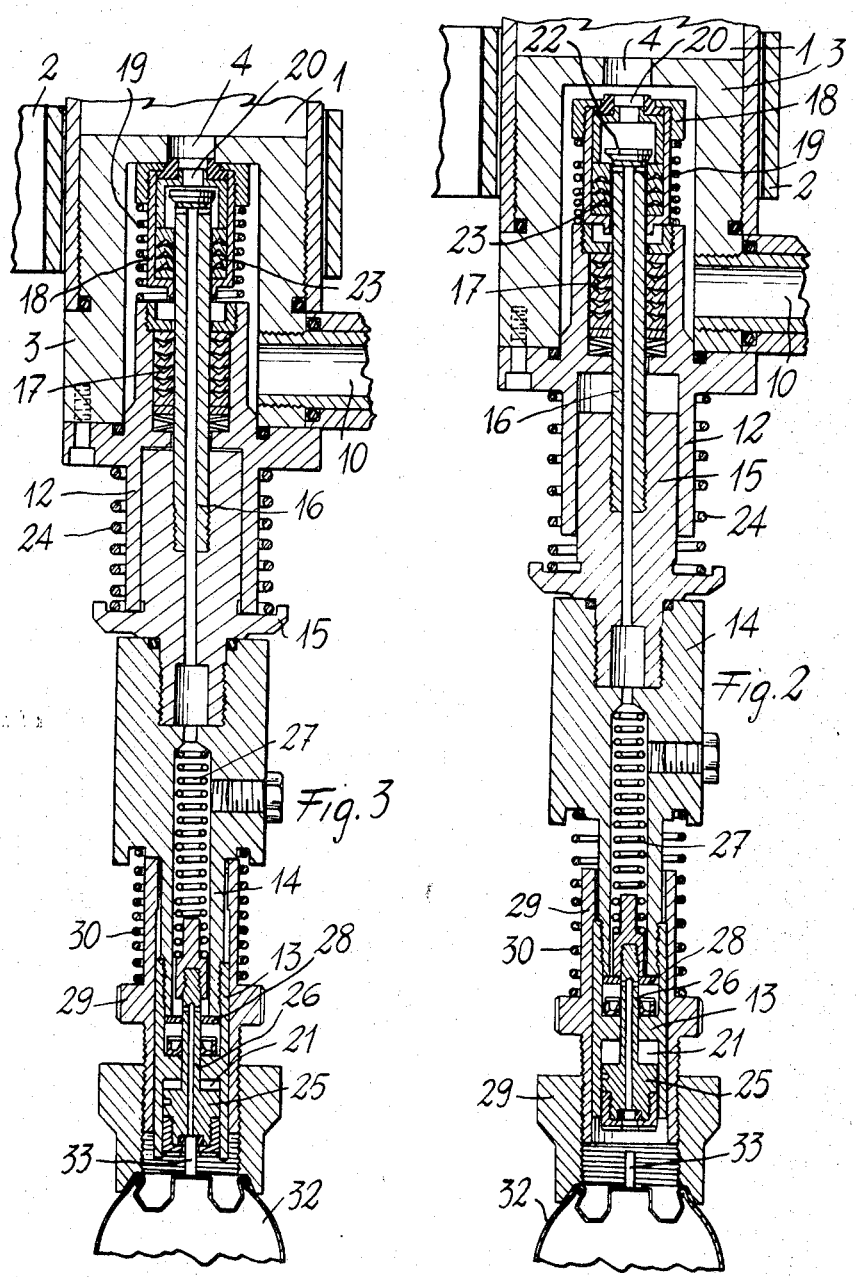

3,532,139

HEAD FOR FILLING CONTAINERS, SUCH AS AEROSOL CONTAINERS, WITH A PREDETERMINED AMOUNT OF A FLUID

The present invention relates to a head for filling containers, such as aerosol containers, with a predetermined amount of a fluid, particularly a propellant.

Aerosol containers must contain a propellant in a predetermined amount and identical as possible in containers identical to one another.

Several types of devices are known for introducing predetermined amounts of propellant into aerosol containers, but such known devices are of a highly complicated structure, expensive to be made and maintenance thereof is difficult.

Therefore, it is the main object of the present invention to provide a head having a simple structure and being of a ready maintenance and comparatively low cost of production, suitable for introducing exactly predetermined amounts of a fluid into a container.

It is another object to provide a head of the above character for attaining the same pressure to the predetermined amount of fluid as introduced into containers identical to one another.

It is still another object to provide a head from which a fluid, according to a metered amount and preselected pressure, is introduced into the container by merely lowering the head onto said container.

These and other objects are attained by a head comprising a cylinder, a hollow chamber communicating with the interior of the cylinder through at least one hole in the cylinder at an end thereof, a conduit connecting the other end of the cylinder with said chamber, a piston sealingly movable within the cylinder, a supply for said pressurized fluid communicating with the hollow of said chamber, a guide means fast with the chamber, a body member movable on said guide means and having a cylindrical portion extending within the hollow of said chamber, a cup accommodated in the chamber hollow and sealingly movable on the cylindrical portion of said body member, the latter being passed through by an elongated hole extending from the end of said cylindrical portion internally of the cup to a mouth in said body member and designed to be drawn near a container to be filled with a fluid, a spring being provided which is effective on the cup for urging it so that a hole in said cup will overlie the connecting hole between the chamber and cylinder shutting off the communication between the chamber hollow and the interior of said cup and cylinder, the end of the cylindrical body member portion within the cup being shaped and effective on said cup against the action of the spring to move said cup hole away from the connecting hole between the chamber and cylinder when said body member is moved on said guide means, the aperture internally of the cup of the elongated hole for said body member freely communicating with the interior of the cylinder only when said cup hole and said connecting hole between the chamber hollow and cylinder overlie each other under the spring action.

In order that the structure and features of the head be more clearly understood, an embodiment thereof will now be described by mere way of example and not of limitation, reference being made to the accompanying drawings, in which:

FIG. 2 is an enlarged longitudinal section showing a detail of the head at rest position; while FIG. 3 is a sectional view of the head corresponding to that of FIG. 2, but at operative conditions, that is, while the container is filled with fluid.

Figure 1:
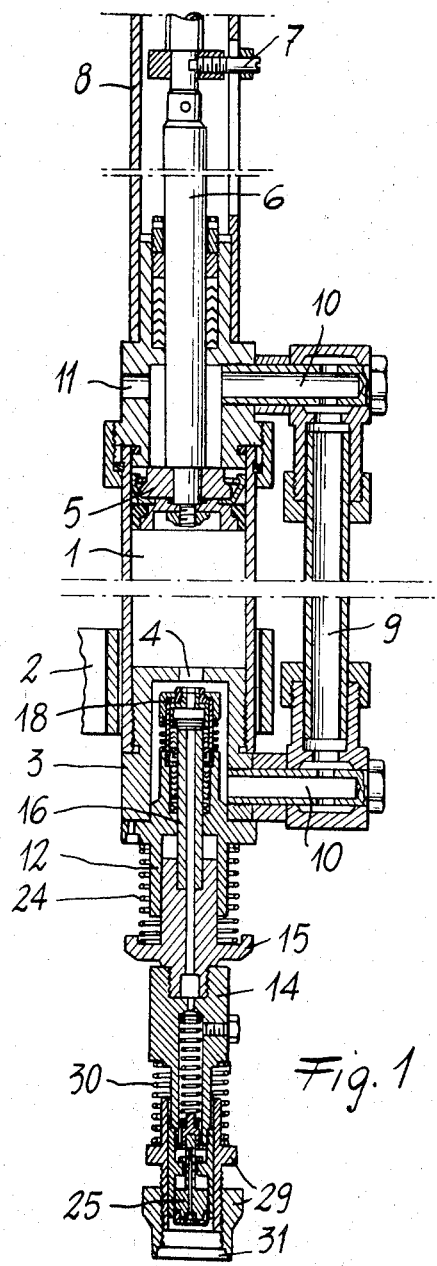
FIG. 1 is a fragmentary longitudinal section of the head.

As apparent from the FIGS., the head comprises a cylinder 1 having a vertical axis, which is supported by an arm 2 and fast with a hollow chamber 3 communicating with the interior of the chamber or cylinder through a hole 4 at the lower cylinder end.

A piston 5 (shown only in FIG. 1) is sealingly movable within cylinder 1 and fast with an elongated stem 6, on which a screw 7 is secured and projects from an elongated slot in a housing 8 enclosing stem 6; screw 7 can be secured at different locations spaced apart from one another along the axis of stem 6, and acts to limit the downward stroke of stem 6 and piston 5 as well.

Hollow of chamber 3 is connected with the cylinder end above piston 5 by a conduit 9 provided with fittings 10, the structure of which is apparent from FIG. 1. At the top of cylinder 1 a hole 11 is formed which, for example, by a hose (for simplicity not shown in the FIG.) is connected with a pressurized propellant supply, such a propellant filling the space above piston 5, conduit 9, hollow of chamber 3 and, under the condition as shown in FIG. 1, the space in the cylinder below piston 5.

A cylindrical guide 12, fast with chamber 3, projects from the bottom of said chamber.

A rigid body member, comprising elements 13, 14 and 15 and an elongated cylindrical portion 16, fast with one another, is movable on said guide 12.

The cylindrical portion 16 of said rigid body member extends within the hollow of chamber 3 by passing through a hole in the bottom wall of the chamber, such a hole being provided with seals 17.

A cup 18 is accommodated within the hollow of chamber 3 and sealingly movable on cylindrical portion 16 of the rigid body member; a spring 19 is effective on cup 18 urging it upward so that a hole 20 in said cup overlies hole 4. In other terms, spring 19 tends to move the cup to the position as shown in FIG. 3, at which position a seal carried on the cup will shut off the communication between said hollow of chamber 3 and interior of cylinder 1.

Elements 13, 14, 15 and cylindrical portion 16 of the rigid body member are passed through by an elongated hole extending from the end of said cylindrical portion 16 internally of the cup to a mouth 21 in element 13.

The upper end of the cylindrical portion 16 is shaped, and more particularly has an enlarged collet 22 abutting a seal 23 within cup 18 and prevents said cylindrical portion 16 from slipping off of the cup and chamber 3 when the head is at a rest position (FIGS. 1 and 2), or when the rigid body member is held as urged away from chamber 3 by a spring 24 acting on element 15 and bottom wall of chamber 3. Under these conditions, collet 22 is downward urged, cup 18 pressing said spring 19; the passageway through hole 4 is free between the interior of cylinder 1 and conduit 9 and pressurized fluid supply, whereas the aperture within the cup of the elongated hole in cylindrical portion 16 is closed, so that, under these conditions, said elongated hole of the rigid body member is not in communication with the interior of chamber 3 and cylinder 1.

A cylindrical element 25 having an elongated stem 26 is accommodated and sealingly movable within mouth 21 of element 13 in the rigid body member, the element 25 and stem 26 being passed through by a hole, the upper end of which internally of the stem communicates with the outside of said stem through a plurality of radial holes, as clearly seen in FIGS. 2 and 3. A spring 27 is accommodated within the element 14 of the rigid body member, the lower end of this spring abutting stem 26 which, at rest conditions, is held as downward urged to the position shown in FIGS. 1 and 2, with the radial holes of stem 26 below a sealing element 28 shutting off the communication between the elongated hole of elements 14 and 15 and the hole in element 25 and stem 26.

A sleeve 29 is mounted on elements 13 and 14 of the rigid body member and axially movable thereon, said sleeve being provided with stops preventing it from slipping off of said elements and which, at rest conditions (FIGS. 1 and 2) is held downward urged by a spring 30, the upper end of which abuts element 14 of the rigid body member. Sleeve 29 downward projects beyond the lower end of element 13 and cylindrical element 25 and has an offset aperture 31 for contacting with container 32 (FIGS. 2 and 3), which is to be filled with fluid from the pressurized supply.

Through arm 2 the head, as described, is fast with a rigid support, not shown in the FIGS. for simplicity, head and arm 2 therewith being able of vertically moving from top to bottom and vice versa, such as under the action of a cam.

When the head is at a rest condition (FIGS. 1 and 2), the pressurized fluid being supplied through hole 11 reaches the interior of chamber 3 through conduit 9 and penetrates into cylinder 1 below piston 5 through hole 4; the pressurized fluid also acts on the upper surface of piston 5, but since the lower surface of piston 5 is larger than the upper surface of said piston, as a result, a force is exerted on the piston in an upward direction causing it to move to the position as shown in FIG. 1. The fluid in cylinder 1, hollow of chamber 3 and within cup 18 cannot outflow of the head since the upper end of the elongated hole in cylindrical portion 16 and elements 13, 14 and 15 of the rigid body member is closed by seal 17, and the upper end of the hole in cylindrical element 25 and stem 26 is located below said sealing element 28.

Assuming now that a container 32 is placed below sleeve 29, the container being provided with a filling valve, such as that mounted on ordinary aerosol containers.

Arm 2, and head therewith are lowered, such as by a cam, as above mentioned; in a first step of the descending movement for the head, said flared aperture 31 of sleeve 29 will contact the upper end of the container which is automatically centered onto the sleeve just owing to said flared aperture (FIG. 2).

Head lowering onto the container being continued, a compression of spring 30 is caused until valve 33 inserts into the lower end of the hole in cylindrical portion or element 25, said hole being provided with a gasket making up a sealing with valve body 23. Further lowering of head onto the container will upward move element 25 into mouth 21 in element 13 of the rigid body member and the simultaneous upward movement of sleeve 29, the upper end of which will bear against the lower surface of an enlargement in element 14 (FIG. 3); under these conditions, the radial holes extending from the hole in element 25 and stem 26 are displaced above sealing element 28, so that the hole in element 25 communicates with the elongated hole in elements 14, 15 and cylindrical portion 16 of the rigid body member.

Lowering of arm 2 being still continued, element 15 will be moved on guide means 12 and spring 24 compressed, whereas cylindrical portion 16 will move within hollow of chamber 3 to hole 4: in a first step of such a movement, cup 18 will move, as urged by spring 19, together with the cylindrical portion 16, maintaining the outlet radial holes of the elongated hole in cylindrical portion 16 at a closed condition by said seal 23.

Lowering of arm 2 being still continued, hole 20 in cup 18 will overlie hole 4 and thus any communication will be shut off between the interior of cylinder 1 and hollow of chamber 3 and any further movement of the cup within said chamber will be prevented.

A further movement of the head will cause another compression of spring 24 and lifting of collet 22 from seal 23 (FIG. 3) and the elongated hole in cylindrical portion 16 of the rigid body member will communicate with the inner cavity of cup 18 and then through holes 20 and 4 with the interior of cylinder 1. By now the interior of cylinder 1 directly communicates with the interior of container 32, and the pressurized fluid in cylinder 1 below piston 5 will flow into the container. The fluid pressure below piston 5 substantially decreases, while the pressure above piston 5 retains, as unaltered, the value corresponding to that of the fluid supply. As a result, the pressurized fluid above piston 5 will impart a lowering movement to said piston causing the fluid in the cylinder below the piston to be fed into the container.

The downward stroke of piston 5 within cylinder 1, and hence the amount of fluid fed from cylinder 1 into the container, is adjustable by stop screw 7 slidable within the elongated slot in housing 8, as above mentioned.

When the head is lifted from the container, the several elements making up the head move by relative movements as opposite to those previously described, that is, first communication between the elongated hole of cylindrical portion 16 and the cup interior is shut off, then communication between the elongated hole in element 14 of the rigid body member is shut off, communication being then established between hollow of chamber 3 and interior of cylinder 1 through hole 2, piston 5 moving upward under the action of the pressure as exerted thereon by the fluid.

When a new container is placed under the head, a metered and controlled pressure amount of fluid can be readily introduced thereinto, as hereinabove described.

From the foregoing it is apparent that head operation is very simple and reliable and introduction of predetermined amounts of fluid into the containers occurs by piston movement through the action being exerted thereon by said pressurized fluid.

I claim:

1. A head for filling containers, such as aerosol containers, with a predetermined amount of a fluid, particularly a propellant, comprising a cylinder, a hollow chamber communicating with the cylinder interior through at least one hole in said cylinder adjacent an end thereof, a conduit connecting the other end of the cylinder with said chamber, a sealing movable piston within the cylinder, a supply for said pressurized fluid in communication with the hollow of said chamber, a guide means fast with the chamber, a body member movable on said guide means and having a cylindrical portion thereof extending within the hollow of said chamber, a cup accommodated within the chamber hollow and sealingly movable on the cylindrical portion of said body member, said body member being passed through by an elongated hole extending from the end of said cylindrical portion internally of the cup to a mouth in said body member and intended to be drawn near a container to be filled with the fluid, a spring being provided which acts on the cup to urge it so as to overlie a hole in said cup on the connecting hole between said chamber and cylinder shutting off the communication between the hollow of the chamber and the interior of said cup and cylinder, the end of the cylindrical portion of the body member internally of the cup being shaped and effective on said cup against the action of the spring to move said hole in the cup away from the connecting hole between the chamber and cylinder when said body member is moved on said guide means, the aperture internally of the cup of the elongated hole in said body member freely communicating with the interior of the cylinder only when said hole in the cup and said connecting hole between the hollow of the chamber and cylinder are overlying each other under the action of said spring.

2. A head according to claim 1, wherein an elongated cylindrical element is accommodated and sealingly movable within said mouth of said body member, said element being passed through by a hole, the end of which facing the outside of the body member supplying said fluid to the container to be filled, the other end of the hole in said cylindrical element communicating with the elongated hole of said body member when said cylindrical element is at a retracted position in said mouth, the communication between the hole of the cylindrical element and the elongated hole of the body member being shut off when the cylindrical element is projecting on said mouth.

3. A head according to claim 2, comprising a sleeve carried on said body member at said mouth, the sleeve being movable on the body member between a position wherein it projects from said body member and a retracted position wherein it abuts the body member, the end of the sleeve externally of the body member having a flared aperture, the axis of which passes through said end facing outwardly of the hold passing through said elongated cylindrical element.

4. A head according to claim 3, wherein said cylindrical portion of said body member, said elongated cylindrical element and said flared aperture of said sleeve are coaxial to one another.